United States Patent
Goeckelmann et al.

(10) Patent No.: US 10,125,672 B2
(45) Date of Patent: Nov. 13, 2018

(54) VALVE DEVICE

(71) Applicant: Bosch Mahle Turbo Systems GmbH & Co. KG, Stuttgart (DE)

(72) Inventors: Jochen Goeckelmann, Salach (DE); Timo Tries, Weissach/Flacht (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 57 days.

(21) Appl. No.: 15/157,156

(22) Filed: May 17, 2016

(65) Prior Publication Data

US 2016/0341112 A1 Nov. 24, 2016

(30) Foreign Application Priority Data

May 18, 2015 (DE) .................. 10 2015 209 042

(51) Int. Cl.
*F16K 17/06* (2006.01)
*F02B 37/18* (2006.01)
(Continued)

(52) U.S. Cl.
CPC .......... *F02B 37/186* (2013.01); *F01D 17/105* (2013.01); *F02B 37/183* (2013.01);
(Continued)

(58) Field of Classification Search
CPC .... F02B 37/186; F02B 37/183; F01D 17/105; F16K 17/06; F16F 7/00; F05D 2250/75;
(Continued)

(56) References Cited

U.S. PATENT DOCUMENTS 4,033,642 A * 7/1977 Sorgatz ............... F16F 1/02
384/215
5,328,408 A * 7/1994 Wolf ............... F16F 15/1442
464/180
(Continued)

FOREIGN PATENT DOCUMENTS

DE 102010043147 A1 10/2011
DE 102010055382 A1 * 6/2012 ........... F01D 17/105
(Continued)

OTHER PUBLICATIONS

English abstract for DE102010043147.
(Continued)

*Primary Examiner* — Minh Le
(74) *Attorney, Agent, or Firm* — Fishman Stewart PLLC (57) ABSTRACT

A valve device for controlling a bypass of an exhaust-gas turbocharger may include a valve disc for opening and closing a bypass opening of a turbine, and the bypass opening may be surrounded by a valve seat. A mandrel may protrude on a rear side of the valve disc. An adjusting lever for pivoting the valve disc may be connected with the mandrel. The adjusting lever may have a through opening that may be pierced by the mandrel. The through opening may be radially limited by an interior surface of the adjusting lever. At least one spring element may be arranged in the through opening, and the at least one spring element may subject the mandrel to a radial force.

18 Claims, 4 Drawing Sheets

(51) Int. Cl.
*F16K 15/02* (2006.01)
*F01D 17/10* (2006.01)
*F16K 1/20* (2006.01)
*F16K 1/36* (2006.01)

(52) U.S. Cl.
CPC .............. F16K 1/20 (2013.01); F16K 1/2007 (2013.01); F16K 1/36 (2013.01); F16K 15/028 (2013.01); *F05D 2220/40* (2013.01); *F05D 2250/75* (2013.01); *F05D 2260/38* (2013.01); *F05D 2260/96* (2013.01); *Y02T 10/144* (2013.01)

(58) Field of Classification Search
CPC ............. F05D 2260/38; F05D 2260/96; F05D 2200/40
USPC ......... 137/485, 315.16, 315.37, 798; 251/78, 251/79, 80, 81, 98, 99, 231, 242, 243, 251/245, 246, 904, 362, 366; 403/109.3, 403/146, 166, 221, 281, 282, 327, 329, 403/392, 397; 464/81, 84, 161, 180; 285/317
See application file for complete search history.

(56) References Cited

U.S. PATENT DOCUMENTS

| | | | | |
|---|---|---|---|---|
| 7,584,936 B2* | 9/2009 | Lewis | ............. | F16D 7/048 251/77 |
| 8,459,022 B2* | 6/2013 | Cizek | ............. | F01D 17/105 251/210 |
| 8,695,338 B2* | 4/2014 | Sato | ............. | F02B 37/025 60/602 |
| 9,011,086 B2* | 4/2015 | Herrera Celaya | .... | F02B 37/183 29/889.2 |
| 9,145,825 B2* | 9/2015 | Kierat | ............. | F02B 37/18 |
| 9,163,556 B2* | 10/2015 | Micanek | ............. | F02B 37/183 |
| 9,464,565 B2* | 10/2016 | Yamaguchi | ............. | F02B 37/183 |
| 9,631,628 B2* | 4/2017 | Takahashi | ............. | F02B 37/183 |
| 2012/0055154 A1* | 3/2012 | Ebert | ............. | F01D 17/105 60/602 |
| 2014/0219713 A1* | 8/2014 | Balsells | ............. | B21F 3/12 403/327 |
| 2014/0366530 A1* | 12/2014 | Murayama | ............. | F02B 37/183 60/602 |
| 2015/0285133 A1* | 10/2015 | Byon | ............. | F02B 37/186 60/602 |
| 2016/0061208 A1* | 3/2016 | Marques | ............. | F02B 37/183 415/148 |
| 2016/0160748 A1* | 6/2016 | Jin | ............. | F02B 37/183 137/599.11 |
| 2016/0178028 A1* | 6/2016 | Lummer | ............. | F02B 37/186 251/321 |

FOREIGN PATENT DOCUMENTS

| | | |
|---|---|---|
| DE | 102010055382 A1 | 6/2012 |
| DE | 102011076361 A1 | 11/2012 |
| DE | 102012101322 A1 | 12/2012 |
| DE | 102012201011 A1 | 7/2013 |
| WO | WO-2010135104 A2 | 11/2010 |
| WO | WO-2014011468 A1 | 1/2014 |

OTHER PUBLICATIONS

English abstract for DE102011076361.
English abstract for DE102010055382.
English abstract for DE102012201011.
German Search Report for DE-102015209042.6, dated Jan. 18, 2016.
English abstract for DE102012101322.

* cited by examiner

VALVE DEVICE

CROSS-REFERENCE TO RELATED APPLICATIONS

This application claims priority to German Patent Application No. 10 2015 209 042.6, filed May 18, 2015, the contents of which are hereby incorporated by reference in its entirety.

TECHNICAL FIELD

The invention relates to a valve device for controlling a bypass, for example a turbine of an exhaust-gas turbocharger, with a valve disc for opening and closing a bypass opening of the turbines surrounded by a valve seat and with a mandrel, which projects on a rear side of the valve disc, and with an adjusting lever for pivoting the valve disc, which is connected with the mandrel of the valve disc. The invention further relates to a charging device with such a valve device and a method for assembling such a valve device.

BACKGROUND

In charging devices, for example exhaust-gas turbochargers, for internal combustion engines, so-called wastegate valves are used for regulating power, said wastegate valves controlling a bypass that circumvents the turbine wheel of the exhaust-gas turbocharger, in order to prevent any possible damage occurring to the exhaust-gas turbocharger if the exhaust-gas stream contains too much power. Poppet valves are usually used, the valve disc of which is pivoted by an adjusting lever, in order to open or close a bypass opening. In order to cope the changing temperatures and temperature gradients during implementation in an automobile, the connection between the valve disc and the adjusting lever has some play, thus allowing the valve disc to be properly adjoined to a valve seat. However, this leads to, for example, that the valve disc can move and thus rattle in the adjusting lever when the bypass valve is open. It is known from prior art that pre-stressing the valve disc in an axial direction retains the valve disc in an end position.

A disadvantage of such an embodiment is that if a warping due to thermal expan-sions needs to be balanced out by the play between adjusting lever and valve disc, the force has to be overcome by the spring. Consequently, the actuating forces needed to close the bypass valve are relatively high.

Such a valve device is known for example from DE 10 2010 043 147 A1. The valve disc is pre-tensioned in an axial direction relative to the adjusting lever by a spring-elastic tensioning element, whereby the valve disc is fixed in a predetermined position on the adjusting lever.

A turbocharger with a wastegate valve, in which the valve disc is pre-tensioned in an axial direction against the adjusting lever by a disc spring, is known from WO 2010/135104 A2.

WO 2014/011468 also discloses an exhaust-gas turbocharger with a wastegate valve, in which the valve disc is pre-tensioned against the adjusting lever by means of an annular spring element.

A valve device for an exhaust-gas turbocharger, which has a centring element, which centres a mandrel of the valve disc in a through opening of the adjusting lever, is known from DE 10 2011 076 361 A1.

Finally DE 10 2012 101 322 also discloses an exhaust-gas turbocharger with a wastegate valve in which a disc spring is provided, in order to axially pre-stress the valve disc relative to the adjusting lever.

SUMMARY

It is the object of the invention to provide an improved or at least a different embodiment of a valve device, which is particularly distinguished by a cost-effective and simple production.

The invention is based on the general concept of increasing the friction between the valve disc and the adjusting lever by means of a spring element, instead of pre-stressing the valve disc in an axial direction, and therefore being able to prevent a rattling of the valve disc within a through opening of the adjusting lever. Therefore, at least one spring element, which subjects the mandrel to a radial force, is arranged in the through opening. Said radial force to which the mandrel is subjected creates a frictional engagement between the mandrel of the valve disc and the through opening of the adjusting lever. This frictional engagement prevents the valve disc being able to move freely in the adjusting lever, thus preventing annoying noises, such as rattling or pattering. The service life of the valve device also increases. At the same time, the spring element enables the position of the valve disc, in particular of the mandrel of the valve disc, to adapt in the through opening of the adjusting lever, in order to balance out the temperature-related expansions of the individual components, thus allowing a sealed closure of the bypass opening at any time.

The terms "radial" and "axial" in the description and the enclosed claims refer to the axis of the through opening of the adjusting lever, which is in particular designed in a circular manner.

A favourable option provides that the at least one spring element extends at least partially radially between the interior surface of the adjusting lever and the mandrel. As the spring element extends radially between the interior surface of the adjusting lever and the mandrel, it allows the spring element to be supported on the interior surface and on the mandrel and thus to exert a radial force on the mandrel.

A further favourable option provides that the spring element has a spring section, which extends within an annular gap formed between the mandrel and the adjusting lever and is designed in such a curved manner that it is tensioned when the mandrel is located in the through opening, and that the at least one spring element has at least one gripping section, which extends at an angle with relation to the spring section. This allows a tensioning of the mandrel within the through opening to be achieved very easily. Furthermore, the gripping section allows the spring element to be fixed to the adjusting lever and not slip.

A particularly favourable option provides that the spring section extends in a substantially axial direction. This allows the spring section of the spring element to extend in the annular gap between the mandrel and the interior of the adjusting lever and thus exert a radial force on the mandrel. In the description and the enclosed claims "substantially extend in a axial direction" means that a main extension of the relevant element is in the axial direction. In particular, the extension in an axial direction is greater than in the radial direction.

An advantageous solution provides that the spring section is designed in a convexly or concavely bent manner. This allows the spring section within the annular gap to change its radial expansion by curvature of the spring section, and therefore the spring section acts as a spring and can thus subject the mandrel to a radial force.

A further advantageous solution provides that the spring section abuts against the mandrel if said mandrel is located in the through opening. Thereby is eliminated the radial play of the mandrel in the through opening and as well generated a frictional engagement between the mandrel and the through opening.

A particularly advantageous solution provides that the spring section abuts against the interior of the adjusting lever. Thereby the spring section can be supported on the interior of the adjusting lever, in order to subject the mandrel to a radial force.

A favourable variant provides that the gripping portion extends in a substantially radial direction. This allows the gripping section to engage behind an edge of the through opening, for example, and thus limit the axial mobility of the spring element, such that the spring element remains positioned in the through opening. In the descriptions and the enclosed claims "substantially extend in a radial direction" means that a main extension of the relevant element is in the radial direction. The extension in a radial direction is in particular greater than in the axial direction.

A further favourable variant provides that the gripping portion abuts against the adjusting lever on a front side of the adjusting lever surrounding the through opening. The gripping section thus prevents the spring element from being able to slip completely into the through opening or even slip through the through opening and thus fall out of the annular gap.

A particularly favourable variant provides that the at least one spring element has two gripping portions, which merge into the spring section at ends of said spring section that are remotely positioned with relation to each other. As the spring element has two gripping portions, said gripping portions are able to retain the spring element even better in the through opening. It can in particular be provided that the two gripping portions of a spring element abut against opposing front sides of the adjusting lever. Thereby the possibility of the spring element being removed from the through opening by a purely axial movement is prevented. If the mandrel is arranged in the through opening, the spring element can no longer be moved radially either, thus preventing the spring element from falling out of the through opening.

A further particularly favourable variant provides that the at least one spring element is designed as a sheet metal shaped part. Such sheet metal shaped parts can be easily produced, thus resulting in a cost-effective solution.

An advantageous option provides that the at least one spring element is designed in a C-shaped curved manner, thus allowing the two gripping sections as well as a convex spring section to be easily formed.

A further advantageous option provides that the valve device has a plurality, three for example, of spring elements, which are arranged in the through opening in an evenly distributed manner, thus allowing a better centring of mandrel within the through opening to be achieved, which enables the stress and wear of the mandrel to be reduced.

A particularly advantageous option provides that the adjusting lever has at least one groove in which the at least one spring element is arranged. The provision of the groove within the through opening of the adjusting lever allows the spring element to be positioned even better, thus in particular preventing the spring element from slipping in the circumferential direction.

A favourable solution provides that the groove extends on the interior surface of the adjusting lever in an axial direction and that said groove transfers from the interior surface to the front surfaces at the front surfaces surrounding the through opening. This allows both the spring sections and the gripping portions of the spring elements to run within the groove, thus ensuring that the spring elements can be particularly well-positioned.

A further favourable solution provides that the gripping portion in part of the groove, which extends in the front side of the adjusting lever, abuts against the adjusting lever. The gripping section thus allows the spring element to be positioned in an axial direction within the through opening.

A particularly favourable solution provides that the at least one spring element is designed in an annular manner, wherein the spring section and the at least one gripping portion are each designed in an annual manner, thus allowing a particularly even distribution of the radial force on the mandrel to be achieved.

An advantageous variant provides that the at least one spring element is a separate component with regard to the valve disc and the adjusting lever. This, for example, allows functionally and cost-optimised materials to be used for the mandrel, the adjusting lever and the spring element.

A particularly advantageous variant provides that the mandrel has a flattened area on an exterior, against which the at least one spring element abuts, when the mandrel is arranged in the through opening. This way, an anti-rotation safeguard of the valve disc with relation to the adjusting lever can be achieved.

The above-stated object is also solved by a charging device, in particular by an exhaust-gas turbocharger with a valve device pursuant to the above description. The advantages of the valve device are thus transferred to the charging device, to the preceding description of which reference is made in this respect.

Furthermore, the above-stated object is achieved by a method for mounting a valve device pursuant to the preceding description, wherein the at least one spring element is initially inserted in the through opening and the mandrel is then guided into the through opening. This allows the adjusting lever to be pre-mounted together with the spring elements in a simple manner and the mandrel of the valve disc need only be inserted in the through opening. Thus, no retroactive tensioning of a disc spring intended to exert an axial force, for example, is required. The mounting of the valve device is thus simplified.

Further important features and advantages of the invention result from the sub-claims, from the drawings and from the associated illustrative description of the figures by means of the drawings.

It is understood that the previously stated and the still to be explained features below can be used not only in the respectively specified combination, but also in other combinations or alone, without departing from the framework of the present invention.

Preferred exemplary embodiments of the invention are illustrated in the drawings and will be explained in more detail in the following description, wherein like reference numerals relate to identical or similar or functionally identical components.

DETAILED DESCRIPTION

Figure 1:
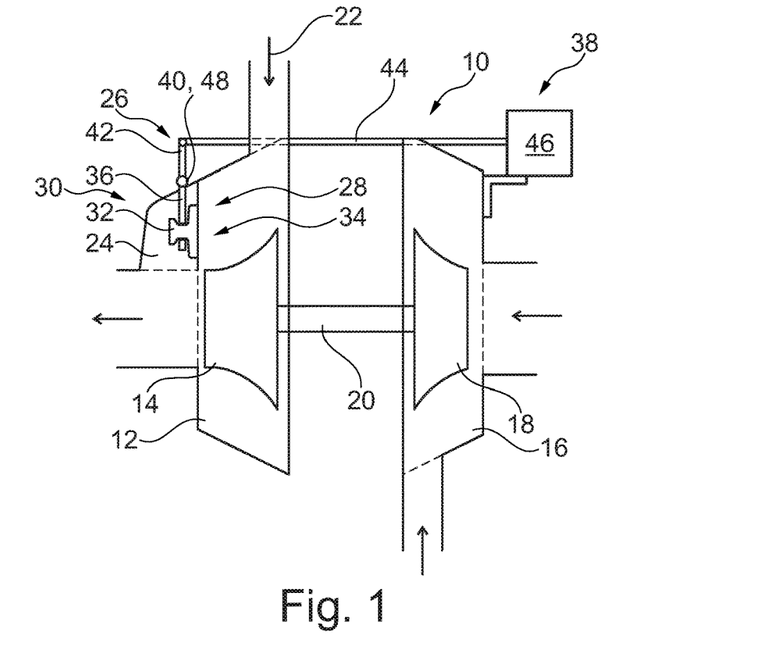
FIG. 1 a greatly simplified schematic illustration of a charging device with a wastegate valve, FIG. 2 a sectional illustration of a valve device for a charging device according to FIG. 1, FIG. 3 a perspective illustration of an adjusting lever of a valve device according to FIG. 2, FIG. 4 a top view of a valve disc of a valve device according to FIG. 2, FIG. 5 a perspective illustration of an adjusting lever of a valve device according to a second embodiment, FIG. 6 a sectional illustration through the valve device according to FIG. 5 in the area of a mandrel of a valve disc, FIG. 7 a perspective illustration of an adjusting lever of a valve device according to a third embodiment, and FIG. 8 a sectional illustration of the valve device in FIG. 7 in the area of the mandrel of a valve disc.

A charging device 10 illustrated in FIG. 1, in particular an exhaust-gas turbocharger, is used for charging internal combustion engines. The charging device 10 comprises a turbine 12 with a turbine wheel 14 and a compressor 16 with a compressor wheel 18, which is non-rotatably connected with the turbine wheel 14 via a drive shaft 20. The turbine wheel 14 is driven via an exhaust-gas stream 22. The connection via the drive shaft 20 also drives the compressor wheel 18, and therefore the power in the exhaust-gas stream 22 can be used to compress fresh air and supply it to the internal combustion engine. The charging device also comprises a bypass 24, which circumvents the turbine 12. This allows the exhaust-gas stream 22 to bypass the turbine 12, and therefore the latter is not driven by the exhaust-gas stream. This can, for example, be necessary if the power of the exhaust-gas stream 22 is too great and could thus damage the turbine wheel 14 and/or the charging device 1.

A wastegate valve 26 is provided, in order to control the through-flow of the bypass 24. To this end the wastegate valve 26 opens and closes a bypass opening 28, such that the exhaust-gas stream 22 can either flow through the bypass 24 or cannot flow through if the bypass opening 28 is closed.

The wastegate valve 26 comprises a valve device 30 with a valve disc and a valve seat 34, which surrounds the bypass opening 28. In a closed position the valve disc 32 rests on the valve seat 34, thus closing the bypass opening 28 and meaning that no exhaust-gas stream 22 can flow through the bypass 24. In an opened position the valve disc 32 is raised from the valve seat 34, thus opening the bypass opening 28 and allowing part of the exhaust-gas stream 22 to flow through the bypass 24 and circumventing the turbine 12. The valve disc 32 can be pivoted between the opened and closed positions. To this end, the valve disc 32 is retained on an adjusting lever 36.

The adjusting lever 36 is in turn driven by an actuating device 38. Said actuating device 38 comprises a spindle 40, on which the adjusting lever 36 is retained, a lever arm 42, which is also retained on the spindle 40 and via which said spindle 40 can be rotated around a spindle axis 48, and an actuating rod 44, which is coupled with the lever arm 42 and a positioning drive 46, and therefore the spindle 40 can be rotated via the servo drive 46. The rotation of the spindle 40 allows the adjusting lever to be pivoted around the spindle axis 48. This causes the valve disc 32 to also be pivoted around the spindle axis 48, in particular between the opening and closing positions.

Figure 2:
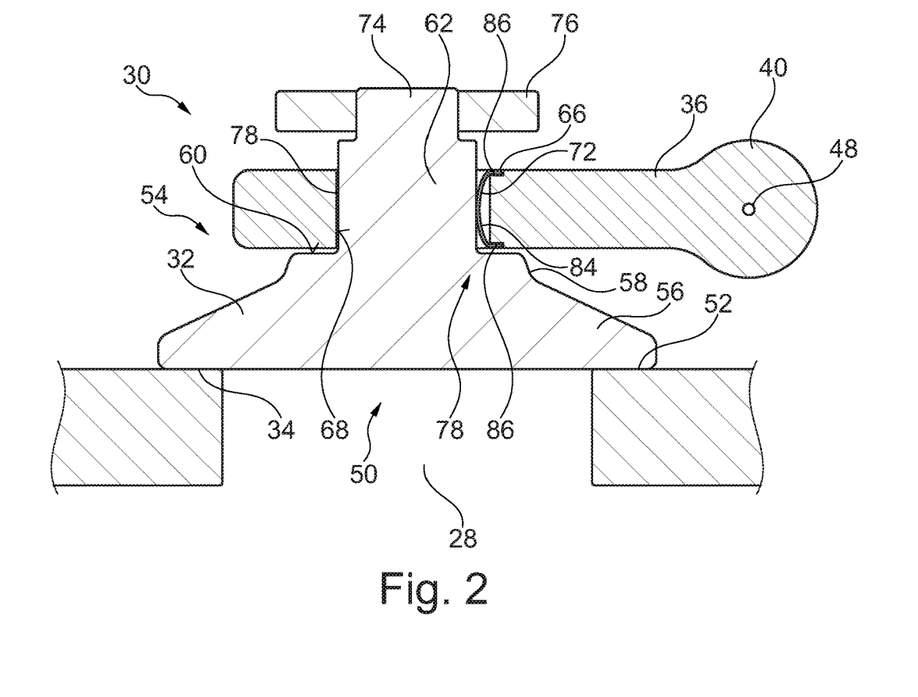
Figure 4:
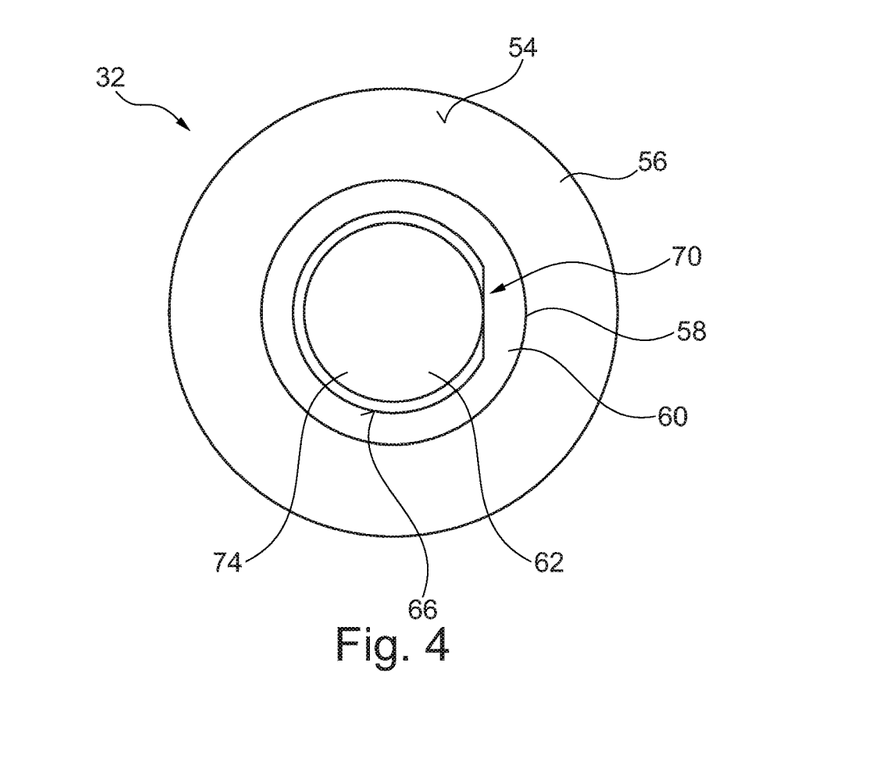

As shown in FIGS. 2 and 4, for example, the valve disc 32 has a front side 50, on which a sealing surface 52 is arranged, and which abuts against the valve seat 34 in the closed position, thus closing the bypass opening 28. The sealing surface is, for example, round, in particular annularly designed, and the valve seat 34 is correspondingly designed in a complementary manner. Accordingly, the front side 50 of the valve disc 32 is preferably designed in an annular manner.

The valve disc 32 has a rear side 54 facing away from the front side 50, said rear side 54 running conically, for example, in an external area 56. Located further inwards in the radial direction is a section 58, which separates the conical externally-located area 56 from an abutment surface 60 for the adjusting lever 36. Said abutment area 60 is a substantially plane annular surface via which the adjusting lever 36 can exert an axial force on the valve disc 32, in order to press said valve disc 32 in the valve seat 34.

The abutment surface 60 surrounds a mandrel 62, which axially extends outwards from the abutment surface 60. In particular, the mandrel 62 is arranged in concentric relation to the front side 50 and/or the sealing surface and the abutment surface 60.

The mandrel 62 has a radially outer exterior surface 66. Said exterior surface 66 has at least one flattened area 70 against which, for example, a spring element 72 can abut. The mandrel 62 engages through a through opening 64 of the adjusting lever 36. Here, the exterior surface 66 of the mandrel 62 thereby abuts against the adjusting lever 36, in particular with an interior surface 68, which radially limits the through opening 64. An annular gap 78 is formed between the exterior surface 66 of the mandrel 62 and of the interior surface 68 of the adjusting lever 36.

The mandrel 62 has a head 74, on which a safety ring 76 is retained, which radially protrudes beyond the exterior surface 66 of the mandrel 62 and thus prevents the mandrel from being able to slide out of the through opening 64 of the adjusting lever 36. The valve disc 32 is thus retained in the through opening 64 of the adjusting lever 36. The valve disc 32 thus has both some radial and some axial play. This also allows the valve disc 32 to be raised from the valve seat 34 into the opened position by the adjusting lever 36.

The adjusting lever 36 is retained on the spindle 40 and can thus be pivoted around the spindle axis 48. As shown as an example in FIG. 3, the through opening 64 of the adjusting lever 36 is eccentrically arranged with relation to the spindle axis 48, thus allowing the valve disc 32 to be raised from the valve seat 34, in particular by a rotation of the spindle 40 around the spindle axis 48.

Figure 3:
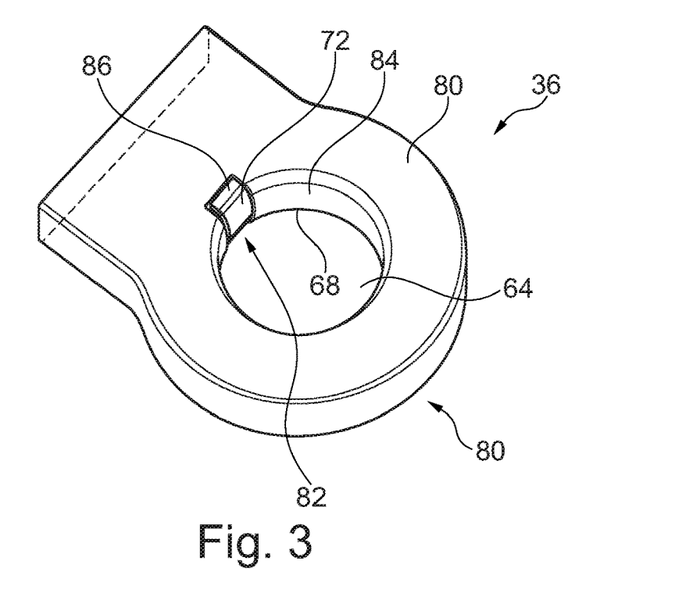

The adjusting lever 36 has two front surfaces 80, which surround the through opening 64 and substantially run parallel in relation to each other. The interior surfaces 68 radially limit the through opening 64. Said through opening 64 is preferably designed in a circular manner.

The adjusting lever further comprises a groove 82, which axially extends on the interior surface 68 and continues to run at a transition to each of the front surfaces 80 and runs radially within the front surfaces 80. The groove 82 thereby extends over the entire axial height of the interior surface 68, whereas said groove 82 only partially extends within the front surfaces 80, in particular in a radial direction preferably less than the length of the axial height of the interior surface 68.

The spring element 72 is arranged in such a way that it exerts a radial force on the mandrel 62. This causes a frictional engagement between the mandrel 62 and the adjusting lever 36, in particular between the exterior surface 66 of the mandrel 62 and the interior surface 68 of the adjusting lever 36. This enables a relative movement in the axial and radial direction between the mandrel 62 and thus the valve disc 32 and the adjusting lever 36 within the framework of the axial and radial play, as long as the frictional force of the frictional engagement is overcome.

Nevertheless, the frictional engagement prevents any uncontrolled rattling of the valve disc 32 in the adjusting lever 36. The pre-stressing of the spring element allows the radial force and thus the frictional force of the frictional engagement to be specifically adapted, thus allowing the desired effect to be achieved.

As shown for example in FIG. 2, the spring element 72 is arranged between the mandrel 62 and the adjusting lever 36, in the annular gap 78 for example. If the spring element 72 is arranged in such a way, said spring element 72 can be favourably supported on the interior surface 68 of the adjusting lever 36, in order to transfer a radial force to the mandrel 62 via the exterior surface 66 of said mandrel 62. The mandrel is thus pressed against the opposite side of the interior surface 68 of the adjusting lever 36, thus creating the frictional engagement there.

The spring element 72 has a spring section 84 auf, which extends with the annular gap 78 and is curved. In particular, the spring section 84 is convexly curved, i.e. the spring section 84 in the axial centre of the spring section 84 juts further beyond the interior surface 68 than at the axial edges close to the front surfaces 80 of the adjusting lever 36.

As an alternative, the spring section 84 can also be designed in a concave manner, i.e. the spring section 84 in the axial center of the spring section 84 juts less beyond the interior surface 68 of the adjusting lever 36 than in the axial edge areas close to the front surfaces 80.

The curvature of the spring section 84 allows the latter to reduce its radial extension within the annular gap in that the curvature is straightened out, thus causing the spring-like conduct of the spring section 84.

Furthermore, the spring element 72 has two gripping portions 86, which run at an angle in relation to the spring section 84. At the axial ends of the spring section 84 said spring section 84 transfers into the two gripping portions 86, which extend radially outwards from there and thus encompass the adjusting lever 36 in such a way that the gripping portions 86 abut against the two front surfaces 80, thus causing the axial position of the spring element 72 to be determined by the gripping portions 86. The spring element 72 cannot readily fall out of the through opening 64.

The spring element 72 is also arranged in the groove 82, and therefore the spring element 72 is positioned in the circumferential direction of the through opening 64. In interaction with the flattened area 70 of the mandrel 62 of the valve disc against which the spring element 72 abuts, this thus results in an anti-rotation safeguard of the valve disc in relation to the adjusting lever 36.

The spring element 72 is preferably configured as sheet metal shaped part and can thus be produced cost-effectively and of a qualitative high-class.

When mounting the valve device, in particular when mounting the valve disc on the adjusting lever 36, the at least one spring element 72 is initially inserted in the through opening 64 of the adjusting lever 36. It is in particular inserted in the groove 82 in such a way that the gripping sections 86 abut against the front surfaces 80 of the adjusting lever 36 from axial directions and thus clamp the spring element 72 to the adjusting lever 36.

This allows the spring element 72 to be positioned very easily, with no fear of said spring element 72 falling out.

Once the spring element 72 has been fitted to the adjusting lever 36, the mandrel 62 of the valve disc 32 is inserted in the through opening 64 of the adjusting lever 36. The safety ring 76 is subsequently fitted to the head 74 of the mandrel 62, and therefore said mandrel 62 cannot slide out of the through opening 64 again.

Figure 5:
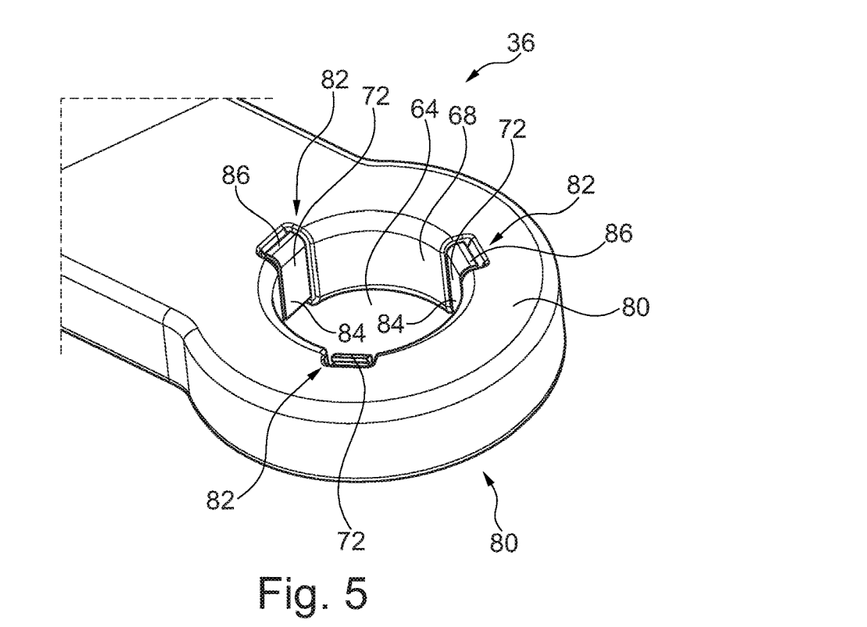
Figure 6:
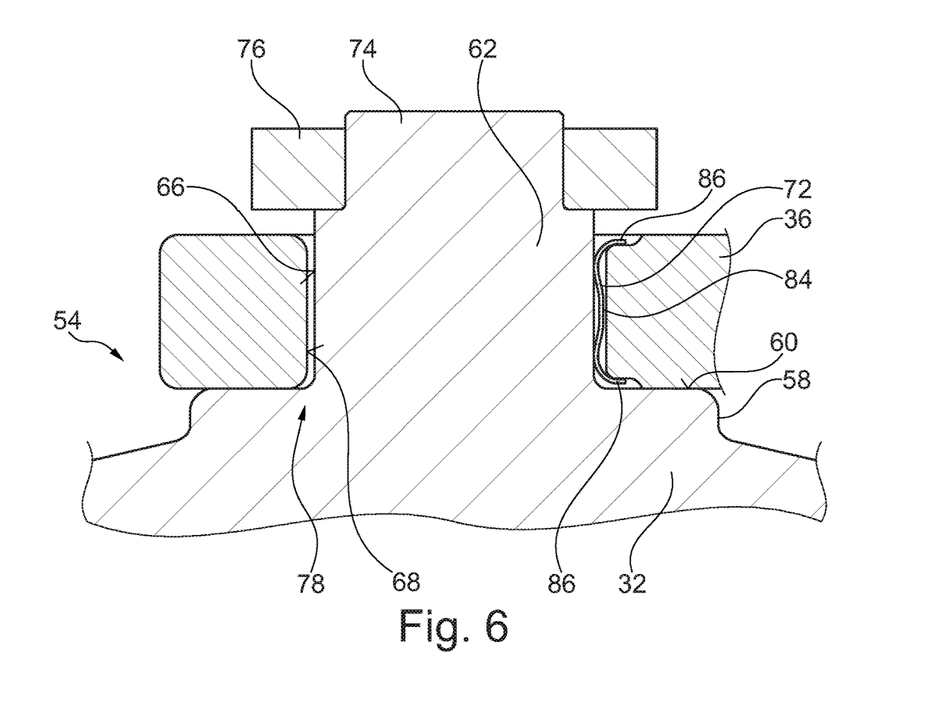

A second embodiment of the valve device 30 according to the invention shown in FIGS. 5 and 6 differs from the first embodiment of the valve device 30 shown in FIGS. 1 to 4 in that said valve device 30 comprises three spring elements 72, which are arranged at substantially regular intervals in the circumferential direction.

The radial force of the spring element 72 is thus distributed more evenly on the mandrel 62, and therefore the valve disc 32 is better centred in the through opening 64. The emerging frictional engagement is thus created between the mandrel 62 and the spring elements 72.

Figure 7:
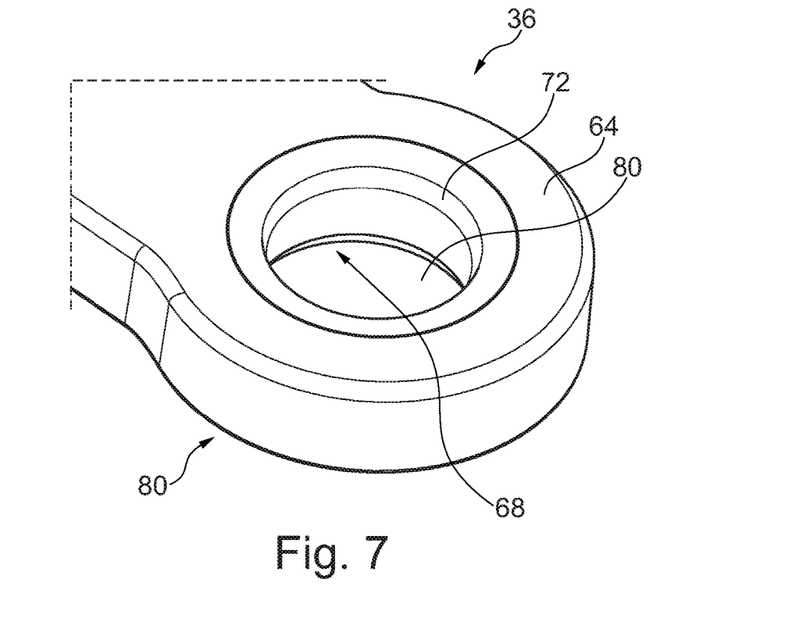

FIG. 7 shows an example of a spring element 72, running in a concavely curved manner within the annular gap 78.

Moreover, the second embodiment of the valve device shown in FIGS. 6 and 7 complies with regard to construction and function with the first embodiment of valve device 30 shown in FIGS. 1 to 4, to the preceding description of which reference is made in this respect.

Figure 8:
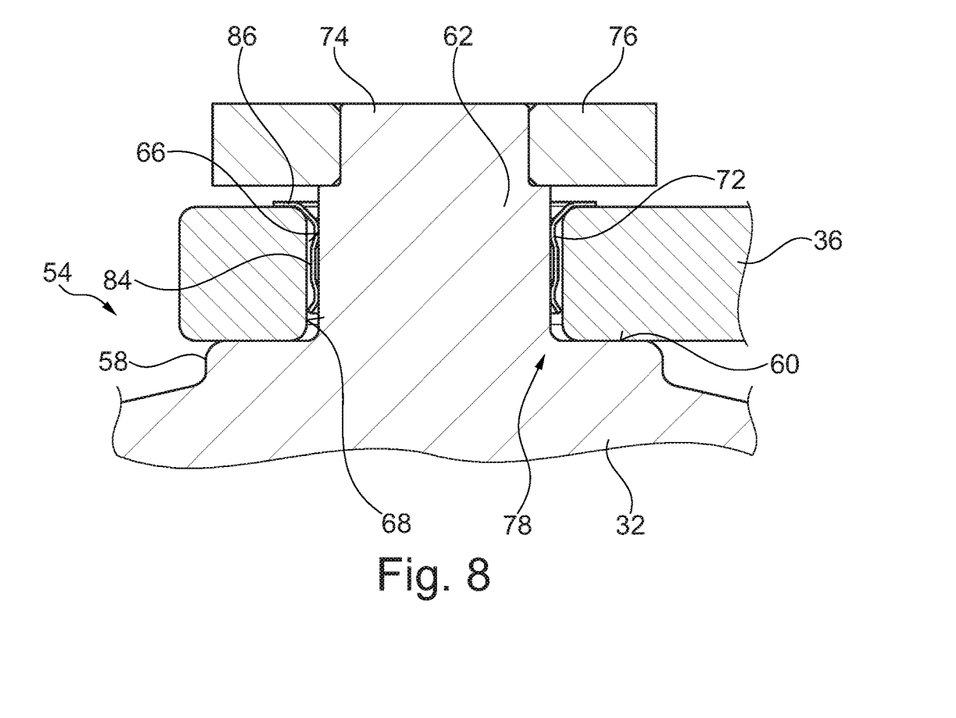

A third embodiment of the valve device 30 shown in FIGS. 7 and 8 differs from the first embodiment of the valve device shown in FIGS. 1 to 4 in that the spring element 72 is not limitedly configured in the circumferential direction, but is instead annularly designed. The spring element 72 thus has only one gripping portion 86, which abuts against the front surface 80 of the adjusting lever 36 facing away from the front side 50 of the valve disc 32.

Alternatively, the spring element 72 can also be inserted between the support surface 60 and the front surface 80 of the adjusting lever 36

Moreover, the third embodiment of the valve device shown in FIGS. 7 and 8 complies with regard to construction and function with the first embodiment of valve device 30 shown in FIGS. 1 to 4, to the preceding description of which reference is made in this respect.

The invention claimed is:

1. A valve device for controlling a bypass of an exhaust-gas turbocharger, comprising:
   a valve disc for opening and closing a bypass opening of a turbine, the bypass opening surrounded by a valve seat,
   a mandrel protruding on a rear side of the valve disc,
   an adjusting lever for pivoting the valve disc, the adjusting lever connected with the mandrel protruding from the valve disc, wherein the adjusting lever has a through opening, which is pierced by the mandrel, and wherein the through opening is radially limited by an interior surface of the adjusting lever, and
   at least one spring element arranged in the through opening, wherein the at least one spring element subjects the mandrel to a radial force;
   wherein the valve disc is retained in the through opening of the adjusting lever with both radial and axial play; and
   wherein at least one of:
      the at least one spring element is configured in a C-shaped curved manner; and
      the adjusting lever has at least one groove in which the at least one spring element is arranged.

2. The valve device according to claim 1, wherein:
   the at least one spring element has a spring section, which extends within an annular gap disposed between the mandrel and the adjusting lever, and the at least one spring element has such a curved configuration that it is stressed if the mandrel is located in the through opening, and the at least one spring element has at least one gripping portion, which extends at an angle in relation to the spring section.

3. The valve device according to claim 2, wherein the spring section extends in a substantially axial direction.

4. The valve device according to claim 2, wherein the spring section is configured in at least one of a concavely curved shape and a convexly curved shape.

5. The valve device according to claim 2, wherein the spring section abuts against the mandrel when the mandrel is located in the through opening.

6. The valve device according to claim 2, wherein the at least one gripping portion extends in a substantially radial direction.

7. The valve device according to claim 2, wherein the at least one gripping portion has a front surface surrounding the through opening of the adjusting lever, and wherein the front surface abuts against the adjusting lever.

8. The valve device according to claim 2, wherein the at least one spring element is configured in an annular shape, and wherein the spring section and the at least one gripping portion are each configured in an annular shape.

9. The valve device according to claim 1, wherein the at least one spring element is configured as a sheet metal shaped part.

10. The valve device according to claim 1, wherein the at least one groove on the interior surface of the adjusting lever extends in an axial direction, and the at least one groove merges from the interior surface to a front surface of the at least one gripping portion that surrounds the through opening.

11. The valve device according to claim 1, wherein the at least one spring element is a separate component with regard to the valve disc and the adjusting lever.

12. The valve device according to claim 1, further comprising a safety ring axially spaced from the adjusting lever and spring element.

13. A charging device, comprising: a valve device for controlling a bypass of a turbine, the valve device including:
a valve disc for opening and closing a bypass opening of the turbine, the bypass opening surrounded by a valve seat;
a mandrel protruding on a rear side of the valve disc;
an adjusting lever for pivoting the valve disc, the adjusting lever connected with the mandrel, wherein the adjusting lever has a through opening, which is pierced by the mandrel, and wherein the through opening is radially limited by an interior surface of the adjusting lever; and
at least one spring element arranged in the through opening, wherein the at least one spring element biases the mandrel with a radial force;
wherein the at least one spring element is configured in a C-shaped curved manner.

14. The charging device according to claim 13, wherein the at least one spring element has a spring section that extends within an annular gap defined between the mandrel and the adjusting lever, and wherein the at least one spring element has a curved configuration such that the at least one spring element is stressed when the mandrel is disposed in the through opening.

15. The charging device according to claim 14, wherein the at least one spring element has at least one gripping portion, and wherein the at least one gripping portion extends at an angle in relation to the spring section.

16. The charging device according to claim 15, wherein the at least one gripping portion has a front face surrounding the through opening of the adjusting lever, and wherein the front face engages against the adjusting lever.

17. The charging device according to claim 14, wherein the spring section engages against the mandrel when the mandrel is disposed in the through opening.

18. A method for assembling a valve device, comprising:
providing a valve disc for opening and closing a bypass opening of a turbine, the bypass opening surrounded by a valve seat;
providing a mandrel protruding on a rear side of the valve disc;
providing an adjusting lever for pivoting the valve disc, the adjusting lever connected with the mandrel, wherein the adjusting lever has a through opening, which is pierced by the mandrel, and wherein the through opening is radially limited by an interior surface of the adjusting lever; and
arranging at least one spring element in the through opening, wherein the at least one spring element biases the mandrel with a radial force;
wherein arranging the at least one spring element in the at least one through opening includes inserting the at least one spring element in the through opening and subsequently guiding the mandrel into the through opening; and
wherein the adjusting lever has at least one groove, and wherein the at least one spring element is arranged in the at least one groove.

* * * * *